United States Patent Office 3,482,550
Patented Dec. 9, 1969

3,482,550
ANIMAL HOLDING GATE
William R. Meredith, Rte. 1, Kiowa, Okla. 74553
Filed Oct. 4, 1967, Ser. No. 672,900
Int. Cl. A61d 3/00
U.S. Cl. 119—98      1 Claim

ABSTRACT OF THE DISCLOSURE

A gate adapted for mounting on the end of chutes for animals having moving parts which are positioned to capture the neck of an animal in the chute. The animal is therewith held temporarily for treatment, inspection, etc.

BACKGROUND OF THE INVENTION

Field of the invention

The present invention relates to the retaining of animals and immobilizing the animals for treatment.

Description of the prior art

It is recognized that the art of working animals in the confined space of chutes is old. Additionally, movable ends on working chutes have been positioned to retain animals until they are immobile. Immobile animals may be medicated, clipped, de-horned and otherwise treated with safety to themselves and personnel. However, simply confining the animals by chute walls does not avoid their rearing and causing injury. A more positive means of control is required for their safety.

SUMMARY OF THE INVENTION

A principal object of the present invention is to hold an animal by its neck within a working chute.

Another object is to cause the animal to automatically trap itself by the neck until released by attending personnel.

The present invention contemplates a framework adapted to be mounted on an end of an animal-working chute. Two pivoted members guided by the frame are yieldingly urged toward each other to capture the neck of an animal. The pivoted members are automatically locked in position when the neck is contacted by the members and are subsequently released manually by personnel.

The invention additionally contemplates locking the pivoted members apart and using a release operated by the animal as the neck of the animal is placed between the pivoted members.

Other objects, advantages and features of this invention will become apparent to one skilled in the art upon consideration of the written specification, appended claim, and attached drawings.

DESCRIPTION OF THE PREFERRED EMBODIMENT

General

Figure 1:
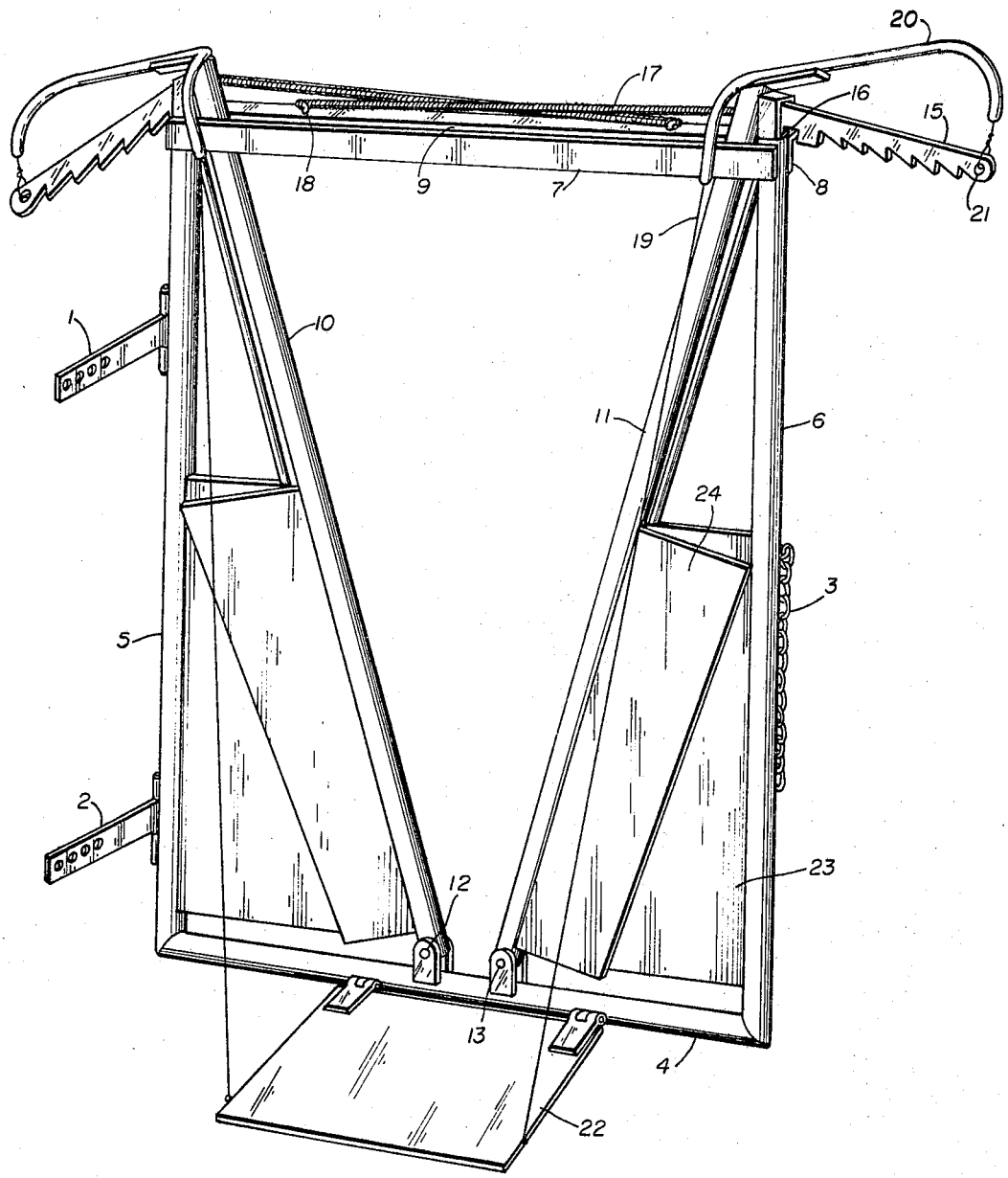
FIG. 1 is an isometric elevation of a gate positioned open to receive an animal and embodying the invention.
Figure 2:
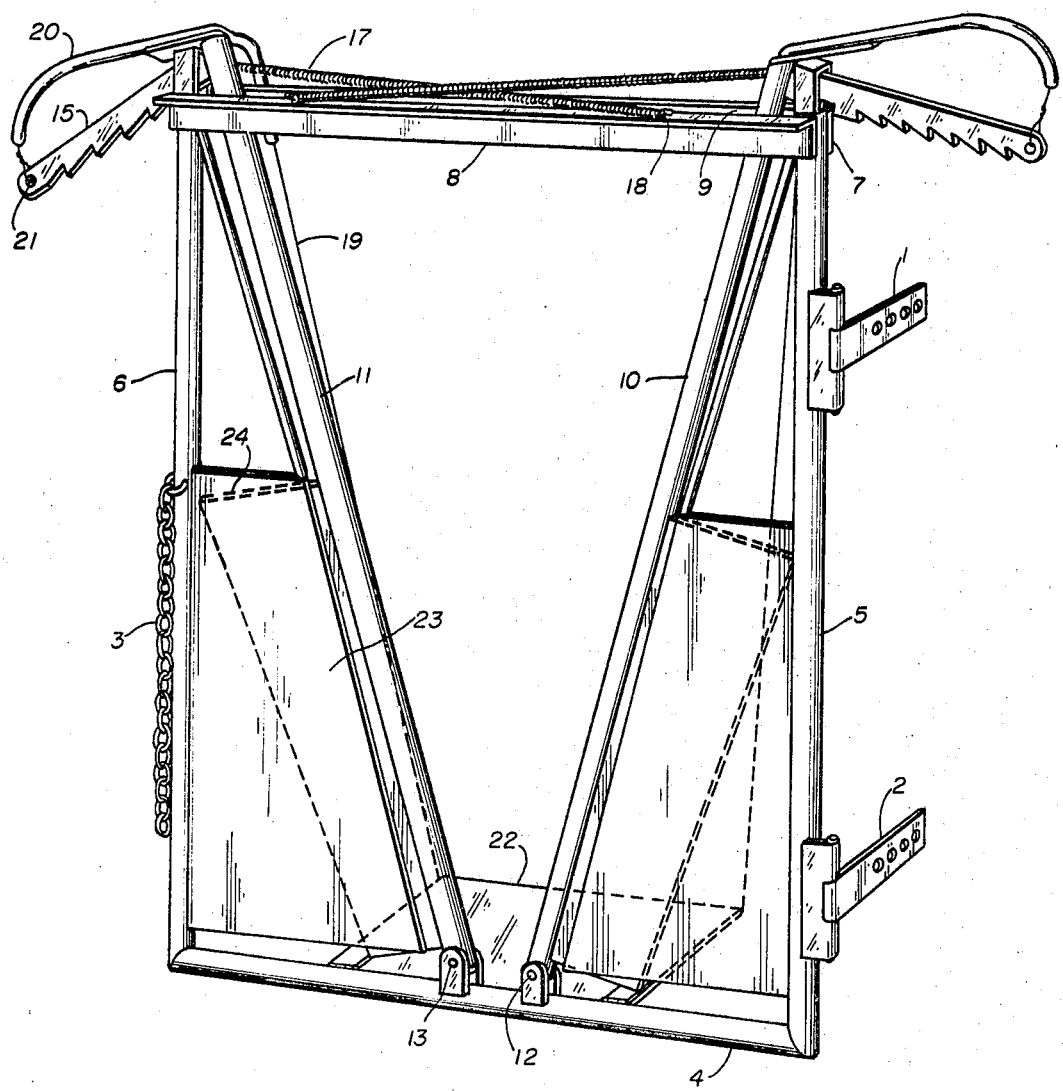
FIG. 2 is the gate of FIG. 1, viewed from the opposite side.
Figure 3:
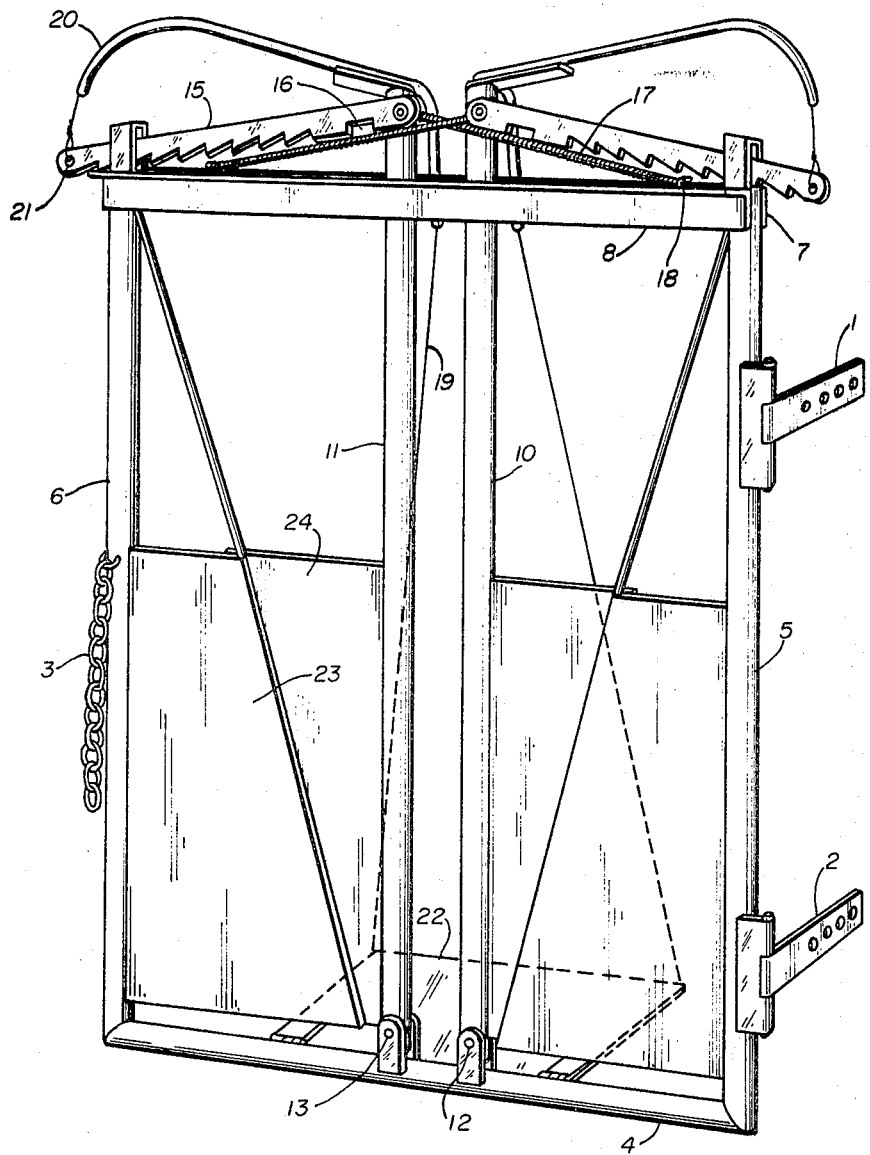
FIG. 3 is the gate of FIG. 1 when closed to hold the neck of an animal.

Each of the three drawing figures shows the same complete gate assembly. FIGS. 1 and 2 show the gate open, ready to receive an animal. FIG. 3 shows the gate closed, as if having the neck of an animal held by the gate.

The gate is adapted to be mounted on the end of a working chute through which animals are driven. The gate can be used temporarily hold, or immobilize, an animal in the chute. If not used, the gate can be held in an open position to allow animals to pass out of the chute, or the gate can be swung completely out of the way of animals passing out of the chute.

More specifically, hinges 1, 2 are mounted on one side of the gate as the means to swingably attach the gate to the end of a chute not shown. A latch is embodied in chain 3, attached to the opposite side of the gate. Chain 3 can be wrapped about a post, or abutment, on one side of the chute to hold the gate in working position.

FIG. 1 (rear view)—Gate open
FIG. 2 (front view)—Gate open
FIG. 3 (front view)—Gate closed As disclosed in all of the views, the gate has a basic frame of sturdy structural members. Base frame member 4 is an elongated bar, or pipe dimensioned to span the mouth of the chute. Upright frame members 5, 6 are similar bars, or pipes, attached to the ends of base frame member 4 and extending up to a height well above the contemplated height of animals passed through the chute.

Upper cross members 7, 8 are arranged horizontal and are attached at the upper portion of and to each side of the upright members 5, 6. So arranged, cross members 7, 8 provide a guiding slot 9 between them which extends between upright members 5, 6. The basic frame, comprised of the members 4–8, is in a plane. Within this area the moving parts of the gate are positioned to hold the neck of an animal extended through the plane of the frame.

A pair of elongated retaining members 10, 11 are pivoted from the base frame member 4. These retaining members 10, 11 may be bars, or pipes, pivoted at 12, 13. They extend from their pivots at 12, 13 to near the top of upright frame members 5, 6, as viewed in FIG. 1. It is the control of the pivoting of these retaining members 10, 11 which carry out the function of holding animals within the chute.

The upper ends of elongated retaining members 10, 11 move along slot 10. They are thereby maintained in the plane of the frame over their pivoting range. In the position disclosed in FIG. 1 they are pivoted as far apart as possible within slot 9. In this position it is possible for an animal to step over base frame member 4, between retaining member 10, 11 and out of the chute.

Retaining members 10, 11 are held in the FIG. 1 position by a latch formed of a toothed bar pivoted near the upper end of each retaining member. Specifically, toothed bar 15 is pivoted on the end of retaining member 11. The teeth are extended downward and a sturdy notch 16 is engaged by the end of upright frame member 6. Bar 15 is pivoted downward to maintain its notch 16 engaged.

A spring 17 is attached to the frame at 18 and the upper end of retaining member 11. As a yielding means, spring 17 constantly urges retaining member 10 to pivot away from the end of upright frame member 6, toward the center of the frame and in the plane of the frame. Both retaining members 10, 11 are controlled in the foregoing arrangement. In FIG. 1 both are locked as shown to keep the gate open. If the toothed bar of each member 10, 11 is pivoted upward to disengage their "open" notches, the members will be pivoted toward each other, and the center of the gate, while guided in the plane of the frame.

Retaining members 10, 11 can be pivoted into the positions disclosed in FIG. 1 manually. The toothed bars can then be pivoted downward to engage the notches and lock the members open. Correspondly, the toothed bars can be subsequently pivoted upwards and the springs take over to close the gate.

A little automation of the gate is feasible, providing a lanyard to lift the toothed bars to close the gate. Lanyard 19 is disclosed as guided by a tube 20 between attachment to bar 15 at end 21 and a hinged plate 22 just back of the gate.

An animal, seeking to go out of the gate and stepping on the plate 22 will release the latch at the end of each retaining member 10, 11. The springs will close the gate, capturing the animal about the neck in the gate.

In order to give the gate more of the appearance of a barrier, particularly when closed, panels 23, 24 are mounted on the frame. Panel 23 is mounted on upright frame member 6 to extend in the plane of the gate. Panel 24 is mounted on retaining member 11. The two panels are mounted so they will overlap, slide over each other when the gate is opened, yet present the uniform appearance of a single panel when the gate is closed. This shutter-like action is evident from an inspection of FIGS. 1 and 3.

When the gate is closed with the neck of an animal through the plane of the frame, pivoted retaining members 10, 11 close on both sides of the neck. Whatever tooth of each bar at the top of each retaining member is above the top of its upright frame member will engage and lock the retaining member in position. The necks may vary in width; there is a series of notches. The gate is quite flexible in the size of animal it can retain.

When it is time to open the gate and release the retained animal, the toothed bars can be pivoted upward to unlatch the gate. Returned to the FIGS. 1, 2 positions from the FIG. 3 position, the gate permits the animal to step over the frame member 4 and escape from the working chute.

CONCLUSION

The gate disclosed can be made of very simple, basic forms of structural metal. The bars, pipes, channels, plates, L-beams, etc. can be cut with a saw or cutting torch and assembled by welding. The hinges, pivots, etc. require somewhat more sophisticated construction, but the over-all device can be put together in a workable assembly by one man.

The moving parts are arranged to efficiently capture an animal by its neck. So immobilized, the animal can be worked with safety.

After having been worked, the animal can be readily released by spreading the retaining members. The animal can walk right through the gate to freedom. The big, efficient latches controlling the retaining members are operated from well above the tossing, possibly horned, head of the animal. Danger is kept to a minimum.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A holding gate for an animal which is treated, including,
    an elongated base frame member adapted to be horizontally positioned so an animal will be forced to step over the middle portion,
    a pair of elongated retaining members pivoted from the middle portion of the base frame member,
    a pair of upright frame members attached to each end of the base frame member,
    a guiding frame member mounted horizontally at a height well above the head of the animal to be held and arranged to maintain the pivoting retaining members in a common plane, comprising a pair of elongated frame members arranged horizontal and with one on each side of the upper ends of the upright frame members to form a slot in which the upper portions of the retaining members move as they pivot,
    yieldable means attached to the pivoted retaining members and arranged to urge them toward each other when the neck of the animal is placed between the retaining members,
    a releasable latch structure attached to the retaining members to lock the retaining means in positions to which they are pivoted, including a toothed bar pivoted on the upper end of each retaining member to engage the upper end of one of the upright frame members and lock the retaining members in predetermined positions to which the retaining members are pivoted,
    a hinged plate on the base frame member arranged to be stepped upon by an animal as the neck of the animal is placed between the pivoted retaining members,
    and a lanyard extending between attachment to the plate and an end of each said toothed bar to pivot each toothed bar from engagement with the upper end of an upright frame member so the yieldable means can move its retaining member toward the other retaining member and capture the animal neck between them.

References Cited

UNITED STATES PATENTS

| | | | |
|---|---|---|---|
| 1,517,573 | 12/1924 | Momyer | 119—99 |
| 2,991,755 | 7/1961 | Ekren et al. | 119—98 |

HUGH R. CHAMBLEE, Primary Examiner